(12) United States Patent
Fischer et al.

(10) Patent No.: US 8,538,629 B2
(45) Date of Patent: Sep. 17, 2013

(54) BOTTLENECK LIGHT AND METHOD OF ASSISTING A DRIVER IN STEERING A VEHICLE

(75) Inventors: Marc Fischer, Nonnenhorn (DE); Dirk Ulbricht, Wangen (DE); Stefan Dollinger, Wenzenbach (DE); Maximilian Austerer, Vienna (AT); Stefan Kraus, Ravensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/283,853

(22) Filed: Oct. 28, 2011

(65) Prior Publication Data
US 2012/0109454 A1    May 3, 2012

(30) Foreign Application Priority Data
Oct. 28, 2010 (DE) .......................... 10 2010 043 033

(51) Int. Cl.
*G06F 17/00* (2006.01)
*B60Q 1/04* (2006.01)
(52) U.S. Cl.
USPC .............. 701/36; 180/274; 340/435; 340/436

(58) Field of Classification Search
USPC ................... 701/36; 340/435, 436; 180/274
See application file for complete search history.

(56) References Cited

U.S. PATENT DOCUMENTS
2007/0102214 A1* 5/2007 Wittorf et al. ................. 180/167

FOREIGN PATENT DOCUMENTS
| DE | 102006041857 A1 | 4/2007 |
| DE | 102005062151 A1 | 7/2007 |
| DE | 2008018512 A1 * | 10/2009 |
| DE | 102008058386 A1 | 5/2010 |

* cited by examiner

*Primary Examiner* — Mary Cheung
*Assistant Examiner* — Brian P Sweeney
(74) *Attorney, Agent, or Firm* — Laurence A. Greenberg; Werner H. Stemer; Ralph E. Locher

(57) ABSTRACT

A device for assisting a driver in steering a vehicle along a bottleneck. The device has a bottleneck detection unit which is configured to detect bottleneck information for characterizing a bottleneck in which the vehicle is located. A bottleneck information processing unit is configured to process the detected bottleneck information in order to derive therefrom assistance information for assisting the driver in steering the vehicle along the bottleneck. An actuation unit is provided and is configured to actuate a light source of the vehicle in such a way that the light source generates a light pattern, which can be seen by the driver, outside the vehicle, which light pattern displays the assistance information to the driver.

16 Claims, 2 Drawing Sheets

BOTTLENECK LIGHT AND METHOD OF ASSISTING A DRIVER IN STEERING A VEHICLE

CROSS-REFERENCE TO RELATED APPLICATION

This application claims the priority, under 35 U.S.C. §119, of German application DE 10 2010 043 033.1, filed Oct. 28, 2010; the prior application is herewith incorporated by reference in its entirety.

BACKGROUND OF THE INVENTION

Field of the Invention

The invention relates to a device for assisting a driver in steering a vehicle along a bottleneck.

In addition, the invention relates to a vehicle.

The invention also relates to a method for assisting a driver in steering a vehicle along a bottleneck.

Furthermore, the invention relates to a program element.

The invention also relates to a computer-readable storage medium.

Vehicle lighting refers to the lighting of vehicles which is necessary to be seen and seen by oneself sufficiently on roads at dusk, in the dark or under poor weather conditions.

Conventional vehicles do not contain any functions whatsoever which permit a user to cope with difficult driving situations such as a driving in the region of bottlenecks, in particular roadwork sites.

SUMMARY OF THE INVENTION

It is accordingly an object of the invention to provide a bottleneck light and a method of assisting a driver in steering a vehicle which overcome the abovementioned disadvantages of the prior art methods and devices of this general type, in which a driver can navigate a vehicle in a region of bottlenecks with a high degree of operator convenience.

According to a first aspect of the invention, a device for assisting a driver in steering a vehicle along a bottleneck is provided. The device has a bottleneck detection unit which is configured to detect bottleneck information for characterizing a bottleneck (in particular for detecting a lateral distance of the vehicle from a boundary of the bottleneck) in which the vehicle is located. A bottleneck information processing unit is provided which is configured to process the detected bottleneck information in order to derive therefrom assistance information for assisting the driver in steering the vehicle along the bottleneck. An actuation unit is configured to actuate a light source of the vehicle in such a way that the light source generates a light pattern, which can be seen by the driver, which light pattern displays the assistance information to the driver (that is to say makes it visually accessible to the driver). According to one exemplary embodiment, the light pattern can be displayed to the driver, in particular, outside the vehicle in particular along the viewing direction thereof, that is to say the light pattern can be projected onto a body which is arranged outside the vehicle and is provided separately from the vehicle, for example a surface of a roadway boundary barrier.

According to another aspect of the invention, a vehicle for example a motor vehicle, in particular a passenger motor vehicle or a truck or a motor cycle having a device having the abovementioned features is made available. However, the vehicle can also be an aircraft such as, for example, an airplane or a watercraft such as, for example, a ship.

According to a further aspect of the invention, a method for assisting a driver in steering a vehicle along a bottleneck is made available, wherein in the method bottleneck information for characterizing the bottleneck in which the vehicle is located is detected. The detected bottleneck information is processed in order to derive therefrom assistance information for assisting the driver in steering the vehicle along the bottleneck. A light pattern which can be seen by the driver is generated in such a way that the assistance information is displayed to the driver. According to one exemplary embodiment, the light pattern can be displayed to the driver, in particular outside the vehicle.

In a computer-readable storage medium according to one exemplary embodiment of the present invention, a program for assisting a driver in steering a vehicle along a bottleneck is stored, which program is configured to carry out or control the method with the features described above when said program is executed by a processor.

A program element (computer program element) according to one exemplary embodiment of the present invention has the method steps described above and controls the method steps or carries them out when it is executed.

Exemplary embodiments of the present invention can be implemented by a computer program, that is to say software, as well as by one or more specific electrical circuits, that is to say using hardware, or in any desired hybrid form, that is to say by software components and hardware components.

The term "bottleneck" is understood within the scope of this application to be, in particular, a local region of a route, (in particular of a road) with a roadway width which is reduced (for example compared to another normal width) and has, for example, narrow lanes. Such a locally reduced roadway width can be defined, for example, by lane boundary barriers such as occur at roadwork sites, in narrow roads with building construction near to the roadway and in similar situations. In the case of a bottleneck it is possible, in contrast to the conventional driving situation in which barrier freedom prevails at the edge of the roadway, for one or more barriers to limit free travel. As a result, a bottleneck can also constitute a particular source of hazard in respect of traffic accidents. According to one exemplary embodiment it is possible to assume that a bottleneck is present when one or more detected decision criteria are met. An example of such a decision criterion is that a lateral distance between the vehicle and a roadway edge and/or a roadway boundary barrier undershoots a predefinable threshold value. Another decision criterion would be that at the same time a predefinable minimum speed of the vehicle is undershot. A further decision criterion would be that, for example, a bottleneck warning sign, for example a sign warning of a roadwork site, is detected by an image recognition system.

"Bottleneck information" is understood to be, in particular, geometric information which relates to the spatial arrangement of one or more components at the bottleneck with respect to one another or their relative position or relative distance with respect to the vehicle. Such a component may be, for example, a roadway boundary barrier or a roadway boundary line. For example, bottleneck information can be acquired by sensor by the bottleneck detection unit, in particular by using one or more distance sensors which sense, in particular, the lateral distance between the vehicle and components in the surroundings (roadway boundary barrier, adjacent vehicle in another lane). During the preferably contactless determination of distance, the sensor detects, for example, the direction and/or transit time of an actively emitted signal which is reflected at the component. The actively emitted measurement beams from distance sensors are, for example, light, infrared radiation, radio waves, microwaves or ultrasound.

The term "assistance information" is understood, in particular, to be information which can be made available to the driver and which makes it easier for the driver to steer the vehicle through the bottleneck and which alerts the driver to, in particular, imminent dangers such as, for example, an inaccessibly short distance from a boundary of the bottleneck. The generation of assistance information can contain the determination of data which permits an at least also visual indication of the distance of the vehicle from an obstacle or other information if the data is used to control the light source.

A "light pattern" can be understood within the scope of this application to be, in particular, a structured arrangement of coherent or incoherent light spots which communicate information to the driver intuitively. These pieces of information can be encoded in the spatial distance between specific spots, in the chronological sequence of light signals and/or in the structure or size of the light pattern.

Within the scope of this application, the various units can be understood to be, in particular, processors, each of which form one of the units. However, it is also possible for more of the units or for all of the units to be implemented in a common processor, for example in a microprocessor or a CPU (Central Processing Unit).

According to one exemplary embodiment of the invention, a system is made available which provides a driver in a special situation with a narrow driving area, for example at a roadwork site, with additional information which makes it easier for the driver to navigate through the bottleneck. Such a system can derive driver-related information on the basis of data which is obtained from the surroundings, such as, for example, the distance of the vehicle from a boundary of the bottleneck, in order to provide the driver in this unfamiliar and particularly hazardous situation with information about the safe navigation through the bottleneck. For this purpose, an actuation unit actuates one or more light sources of the vehicle in such a way that a generated structured light pattern provides the driver in an intuitive fashion with information about the state of the vehicle in relation to the bottleneck. As a result, improved driving safety is made possible accompanied by a high level of user convenience. For example, in the case of roadwork sites with peripheral structures (for example concrete blocks) a driver can be relieved of the need to make difficult estimates of a distance of the vehicle from the peripheral structure and corresponding distance information in the form of an intuitive visual code can be displayed to the driver, which code the driver can perceive comfortably without adversely affecting the concentration on steering the vehicle.

In the text which follows, further configurations of the device are described. These also apply to the vehicle, to the method, to the program element and to the computer-readable storage medium.

According to one exemplary embodiment, the bottleneck detection unit can have an image recording unit for recording at least one image of the bottleneck. For example, the bottleneck can be detected on the basis of visual data which can be recorded by one or more cameras. For example, one camera can be oriented along the viewing direction of a driver. Alternatively or additionally it is possible to mount one or more cameras, in particular on the side of the vehicle, in order to make available information which the driver cannot see, or cannot see easily, in his viewing direction. Alternatively or additionally to providing one or more cameras or image recording units, it is also possible to use other sensors which make available information about the bottleneck. It is therefore possible also for a distance measurement to be carried out, for example, by radar, transit time measurements of radiation, infrared cameras or the like. An image therefore may not only be a visual image but may also be a thermal image or be derived from ultrasound measurements.

According to one exemplary embodiment, the assistance information can contain information relating to a position of the vehicle, a width of the roadway, a position of a roadway boundary barrier, a distance of the vehicle from a roadway boundary barrier and/or a distance of the vehicle from an adjacent lane. Such information is helpful for avoiding the situation in which a driver who is subject to particular demands in a roadwork situation impacts with his vehicle, for example, laterally against an obstacle, such as, for example, another vehicle or a vehicle boundary barrier.

According to one exemplary embodiment, the actuation unit can be configured to actuate the light source of the vehicle in such a way that the light source generates the light pattern in addition to or independently of headlight lighting of the vehicle. In other words, the structured light pattern which provides the driver, in particular, with information regarding the bottleneck, can be provided separately from the headlight lighting. This separate provision is to be understood as meaning in functional terms that the headlight lighting can be activated or deactivated selectively separate from or together with the light pattern. The light pattern can be switched on in a user-defined fashion by virtue of the fact that a user activates a corresponding switch or some other activation element. However, it is also possible that in the case of automatic detection of a bottleneck on the basis of one or more decision criteria, a processor automatically switches on the bottleneck lighting when such a bottleneck is detected.

According to one exemplary embodiment, the actuation unit can be configured to actuate the light source of the vehicle in such a way that the light source projects the light pattern onto the roadway or onto a roadway boundary barrier which delimits the roadway. The light source can also be directed at other targets outside (or even inside) the vehicle and projects it. As a result, the light passing can be projected to a desired location which permits a user to perceive the light pattern from his sitting position which he has assumed while driving the vehicle. In particular, when the structured light pattern is projected onto a roadway boundary barrier of a roadwork, the bottleneck information can be displayed to the user without overlapping with headlight lighting or the like occurring here, which restricts the perceptibility.

According to one exemplary embodiment, the actuation unit can be configured to actuate the light source of the vehicle in such a way that the light source generates the light pattern with a visual code which indicates to the driver the current distance of the vehicle from a roadway edge or from a roadway boundary barrier which delimits the roadway. Such a code can be configured in such a way that it provides a user in an intuitive fashion with important information about the present state of the vehicle as it passes the bottleneck. Since the current distance from a roadway edge or a roadway boundary barrier is indicated, a collision with such an object is reliably avoided and it is ensured that the driver steers the vehicle through the bottleneck at a correct position.

The visual code can optionally be supplemented by an acoustic code (for example a tone or a sequence of tones, the pitch of which or the chronological spacing or the duration of which constitutes a measurement for a distance of the vehicle from a lateral barrier) and/or a haptic code (for example vibration of a steering wheel, the chronological spacing of which or the intensity of which constitutes a measure of a distance of the vehicle from a lateral barrier).

According to one exemplary embodiment, the code can be a spatially spaced-apart pair of light structures (for example a pair of light points, a pair of light lines or a pair of circular lines) or a chronologically spaced-apart light pattern (for example a flashing light structure). If the code is a spatially spaced-apart pair of light structures, it is then possible, for example, for the present distance between the two light structures to be selected to be proportional to a present distance of the vehicle from a roadway boundary barrier. If the present distance of the vehicle from a roadway boundary barrier or a roadway edge changes, the distance between the two light points, which are projected at a suitable location, also changes. As an alternative to the distance between two light points, the distance of the vehicle from a roadway edge or roadway boundary barrier can also be expressed through chronological spacing of a light pattern, for example through flashing of a point or of a light pattern, wherein the flashing frequency can be selected which is higher the smaller the distance of the vehicle from the roadway boundary barrier. Other codes are possible such as, for example, the coding of the distance in the form of the size of a light pattern. If, for example, the light pattern is implemented as a circular surface, it is therefore possible, for example, for the circular diameter to be selected to be proportional to the current distance of the vehicle from the roadway edge or roadway boundary barrier. It is also possible for this visual code to be combined with another code, for example an acoustic alarm and/or a haptic alarm (for example vibration of the steering wheel) when the current distance undershoots a predefinable threshold value.

According to one exemplary embodiment, the actuation unit can be configured to actuate the light source of the vehicle in such a way that the light source generates the light patterns as a light pattern with a color which changes over time, as a multi-color colored pattern, an arrangement of a plurality of light points, brightness pattern and/or as a pattern which changes over time. In the case of a multi-color colored pattern, that is to say a colored pattern which contains different wavelength ranges of visible light of different spatial and/or chronological sections, information can be encoded into the colors. For example, red can indicate particularly hazardous information (for example when the distance drops below a dangerous minimum value). When the distance is greater but still critical then the light structure can assume a yellow color (for example when the distance is adjusted to less than a different predefinable threshold value). In the case of a greater and sufficient distance the light structure can have a green color (for example when the distance lies in a setpoint interval). The multiple colors can either vary over time or can vary spatially. When a plurality of light points are provided, the distance between them and/or their size can contain assisting information. In the case of a brightness pattern, information can be encoded into the brightness. In the case of a pattern which changes over time, it is possible, for example, for the information to be encoded in a flashing frequency or the like.

According to one exemplary embodiment, the device can also have the light source which can be embodied as a front headlight or as part of a front headlight of the vehicle. It is therefore possible for the light source to be used as part of the front headlight, which ensures a compact design. However, it is also possible for the light source to be provided separately from the front headlight.

It is to be noted that embodiments of the invention have been described with respect to different inventive subject matters. In particular, a number of embodiments of the invention are described with device claims and other embodiments of the invention with method claims. However, when a person skilled in the art reads this application it will be immediately clear to the person that, unless specified otherwise, in addition to a combination of features which are associated with one type of inventive subject matter any desired combination of features which are associated with different types of inventive subject matters is also possible.

Other features which are considered as characteristic for the invention are set forth in the appended claims.

Although the invention is illustrated and described herein as embodied in a bottleneck light and a method of assisting a driver in steering a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The individual figures of the drawing of this application are to be understood merely as schematic and as not being true to scale.

DETAILED DESCRIPTION OF THE INVENTION

Identical or similar components in different figures are provided with identical reference symbols.

Exemplary embodiments of the invention include particular actuation of the front headlights in order to illuminate the road in an optimum way within a roadwork area.

In particular, exemplary embodiments of the invention make available a method for providing a driver with additional information by an additional light. The information can be encoded by structuring a light pattern.

A roadwork assistance according to an exemplary embodiment of the invention is intended to assist a driver in traveling through roadwork sites in which lanes are narrow and the lane boundaries are formed by fixed high barriers on one side or on both sides.

It is possible for light markings (structured light) to be displayed to the driver on the boundaries or the roadway, the light markings making it easier for the driver to estimate better the width of the roadway, the current position of the vehicle on the traffic lane and the distance of the vehicle from the roadway-delimiting structure (barriers, roadway divider etc.).

An exemplary embodiment contains an image recording unit, a unit for processing recorded images and one or more actuation units for generating the structured light which is described below.

The traffic situation in front of the vehicle is detected using the image-recording unit and an image-processing unit. In particular it is possible to detect: the roadwork situation, roadway-delimiting structures and/or the position of the vehicle with respect to the traffic lane and the structures delimiting the roadway.

The information that the vehicle is within the abovementioned situation, the current position of the vehicle within the traffic lanes and/or the type and position of the objects delimiting the roadway are utilized to generate structured light. The structured light is projected onto the barriers or the roadway.

The structured light is defined, according to one exemplary embodiment of the invention, by the following properties:
a) The structured light is generated in addition to the normal light;
b) It is generated in such a way that the oncoming traffic cannot be dazzled;
c) The structured light is configured in such a way that it can easily be recognized from the position of the driver;
d) Furthermore, the structure of the light is intended here to assist the driver in estimating the width of his lane and specifically the distance from the roadway-delimiting structures; and
e) The structuring can be generated, inter alia, by different colored patterns, by brightness patterns or by patterns which change over time (for example pulsation).

An actuator unit can be used to generate the structured light in accordance with the prescriptions of the processing unit.

Figure 1:
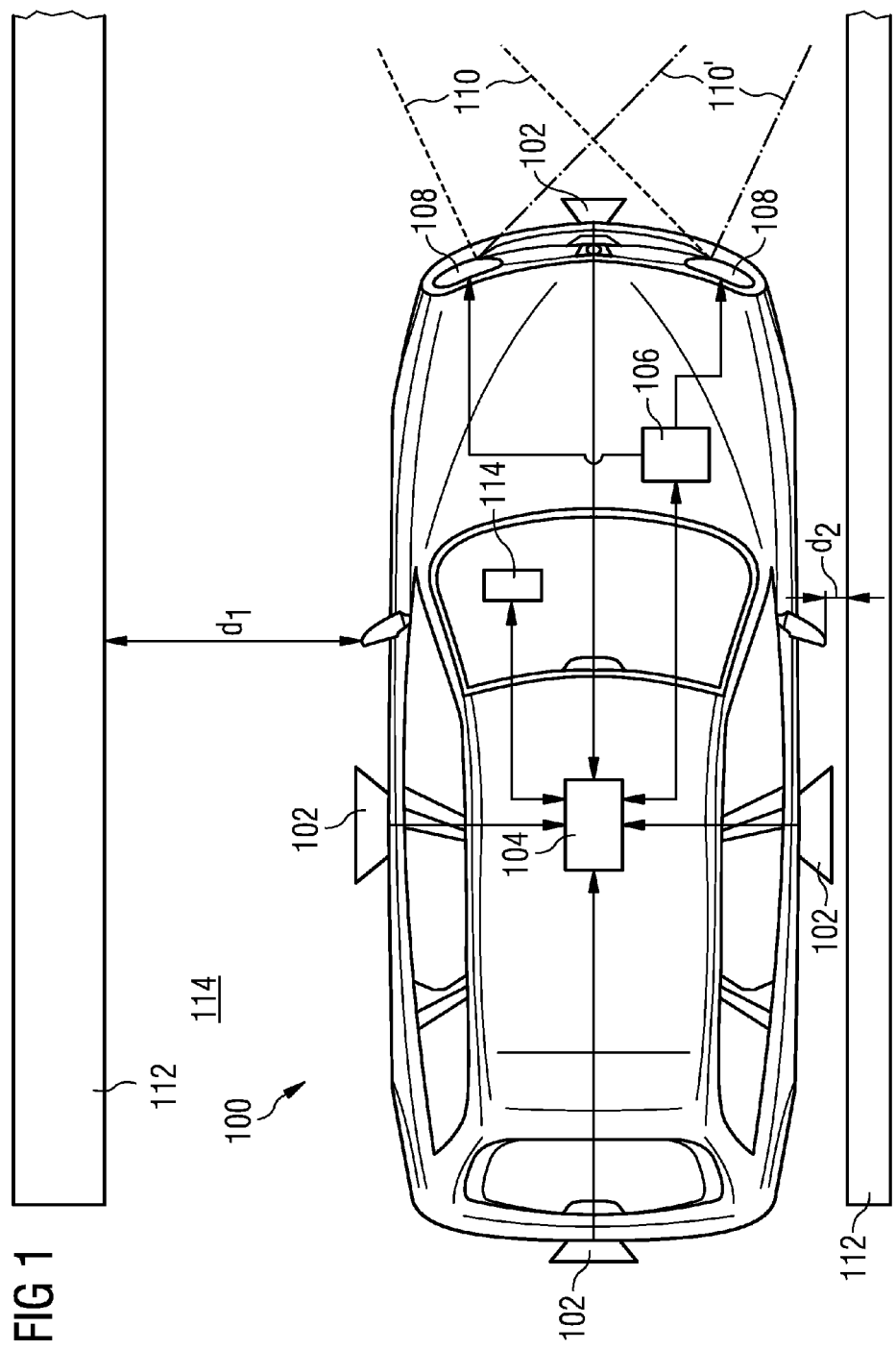
FIG. 1 is an illustration showing a system for assisting a driver in steering a vehicle along a roadwork site according to an exemplary embodiment of the invention.

FIG. 1 shows a motor vehicle 100 according to an exemplary embodiment of the invention. The motor vehicle 100 contains a system for assisting a non-illustrated driver in steering the vehicle 100 along a roadwork site. Such a roadwork situation is shown in FIG. 1, where a roadway 114 is made narrower than a conventional width, in the exemplary embodiment shown by the provision of roadway boundary barriers 112 on both sides.

According to FIG. 1, a bottleneck detection unit which is configured as an image recording unit is provided which has four separate optical cameras 102, wherein in other exemplary embodiments another image recording system (for example one based on ultrasound) or any other sensor system may be provided. One of these cameras 102 is arranged so as to record images in the direction of travel, two of the cameras 102 are arranged so as to record images laterally and the fourth camera 102 is directed in the opposite direction to the direction of travel of the vehicle 100. As an alternative to the arrangement shown with four cameras 102, any other number is possible, in particular a single camera or two cameras 102 arranged, for example, with lateral orientation may also be sufficient. The cameras 102 detect information relating to the roadwork situation, in particular distances $d_1$ and $d_2$ of the vehicle 100 from the respective barriers 112.

The optical camera data are transmitted from the cameras 102 to a bottleneck information processing unit 104. The latter is configured to process the bottleneck information detected by the cameras 102 in order to derive therefrom assistance information for assisting the driver in steering the vehicle 100 along the bottleneck illustrated. Such assistance information is an indication of a present distance of the vehicle 100 from the roadway boundary barriers 112, which is intuitive and displayed to the driver visually. In other words, the bottleneck information processing unit 104 can have a processor capability in order to calculate corresponding distance information or the like from the optical image data and to determine the visual representation.

Once this has occurred, the bottleneck information processing unit 104 of an actuation unit 106 makes the assistance information available in the form of electrical signals. The actuation unit 106 is configured to actuate light sources 108 which are accommodated in the headlights of the vehicle 100 or in a part thereof. The actuation takes place in such a way that the light sources 110 generate a light pattern 110 which can be seen by the driver and which makes the assistance information visually accessible to the driver. In other words, by controlling the actuation unit 106 the light sources 108 generate such a light pattern 110 that the driver can perceive the assistance information by viewing the light pattern 110 when the pattern is directed onto an object such as, for example, the roadway 114 or one of the roadway boundary barriers 112.

In addition, FIG. 1 shows an input/output unit 114, which can also be referred to as a user interface. This permits a driver (also the user such as, for example, a front seat passenger) optionally to switch the roadwork light on or off, to set operation parameters in a user-defined fashion etc. The input/output unit 114, which may have knobs, a touchpad, a keypad etc., is therefore coupled with a bidirectional communication capability to the bottleneck information processing unit 104.

For example, a flashing frequency of the structured light pattern 110 can be selected to be higher the shorter the distance $d_1$. In addition, a flashing frequency of another light pattern 110' can be set such that this is higher the smaller the distance $d_2$. The light pattern 110 which is characteristic of the distance $d_1$ is intuitively projected onto the driver's left-hand side, while the other light pattern 110', which is characteristic of the distance $d_2$, is projected onto the driver's right-hand side.

Figure 2:
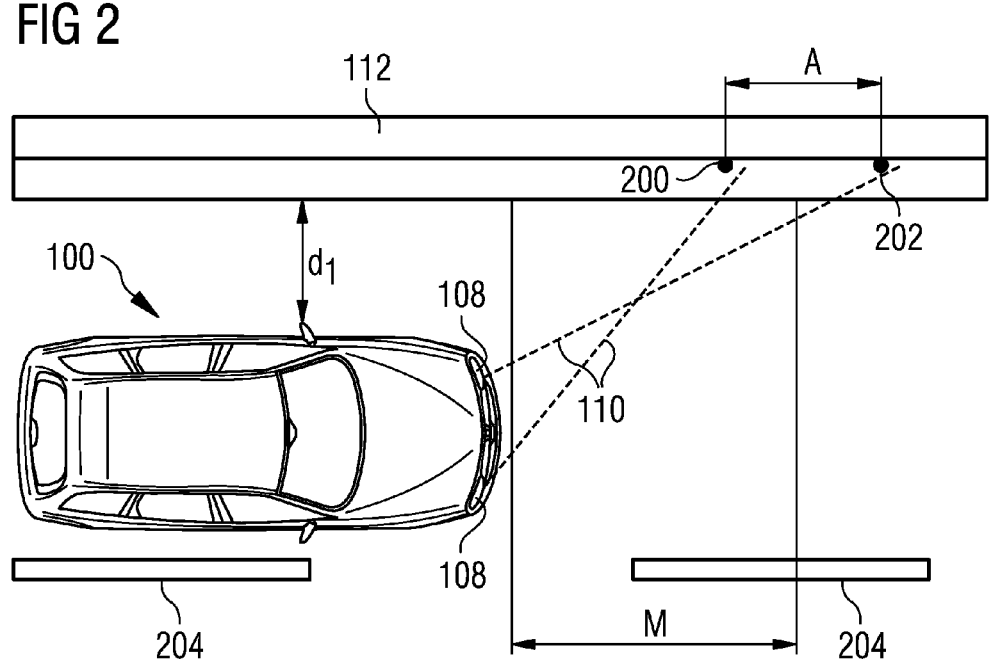
FIG. 2 and FIG. 3 are illustrations showing a vehicle in a bottleneck according to an exemplary embodiment of the invention.
Figure 3:
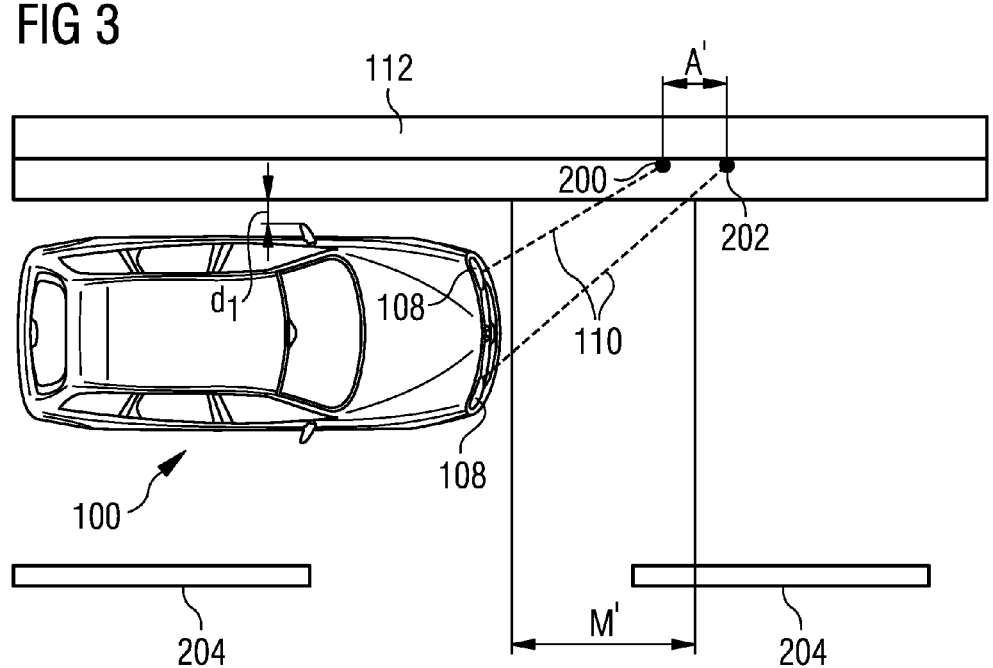

FIG. 2 and FIG. 3 show two different scenarios in a roadwork situation.

FIG. 2 shows the vehicle 100 on the left-hand traffic lane. This traffic lane is delimited on the left in the direction of travel by the barrier 112. FIG. 3 shows the vehicle 100, also on the left-hand traffic lane, but at a shorter distance from the barrier 112. FIG. 2 and FIG. 3 also show markings of a central reservation 204.

FIG. 2 and FIG. 3 also show how a distance A or A' between two light points 200, 202 makes it possible to infer a distance $d_1$ or $d_1'$ from the barrier 112. As is apparent from FIGS. 2 and 3, the distance A or A' between the light points 200, 202 also differs as a function of the respective distance $d_1$ or $d_1'$ from the barrier 112, and the average distance M or M' between the light points 200, 202 and the vehicle 100 also differs correspondingly.

In FIGS. 2 and 3, the generation of the two light beams 110 is also adopted as an example of structured roadwork light. These light beams 110 generate the points 200, 202 on the surface of the barrier 112.

The difference between FIGS. 2 and 3 is the distance of the vehicle 100 from the barrier 112. The distance between the points 200, 202 differs with the distance between the vehicle 100 and the barrier 112, but the average distance between the two points 200, 202 and the vehicle 100 also differs. On the basis of this information, the driver can estimate better the position of his vehicle 100 in relation to the barrier 112.

It is to be noted that the embodiment described here merely constitutes a restricted selection of possible embodiment variants of the invention. It is therefore possible to combine the features of individual embodiments with one another in a suitable way, so that for a person skilled in the art the embodiment variants which are made explicit here can be considered to publically disclose a multiplicity of different embodiments.

The invention claimed is:

1. A device for assisting a driver in steering a vehicle along a bottleneck, including a roadwork site, the device comprising:

a bottleneck detection unit configured to detect bottleneck information for characterizing the bottleneck in which the vehicle is disposed;

a bottleneck information processing unit connected to said bottleneck detection unit for processing the bottleneck information detected to derive therefrom assistance information for assisting the driver in steering the vehicle along the bottleneck; and an actuation unit for actuating a light source of the vehicle such that the light source generates a light pattern, which can be seen by the driver, outside the vehicle, the light pattern displaying the assistance information to the driver, said actuation unit connected to said bottleneck information processing unit;

said actuation unit configured to actuate the light source of the vehicle such that the light source:

generates the light pattern with a visual code which indicates to the driver a current distance of the vehicle from a roadway edge or from a roadway boundary barrier which delimits a roadway, and generates the visual code as a spatially spaced-apart pair of light structures, where a distance between the spatially spaced-apart pair of light structures is proportional to the current distance of the vehicle from the roadway edge or from the roadway boundary barrier which delimits a roadway.

2. The device according to claim 1, wherein said bottleneck detection unit has an image recording unit for recording at least one image of the bottleneck.

3. The device according to claim 1, wherein the assistance information contains information relating to at least one of a position of the vehicle, a width of a roadway, a position of a roadway boundary barrier, a distance of the vehicle from the roadway boundary barrier or a distance of the vehicle from an adjacent lane.

4. The device according to claim 1, wherein said actuation unit actuates the light source of the vehicle such that the light source generates the light pattern in addition to or independently of headlight lighting of the vehicle.

5. The device according to claim 1, wherein said actuation unit actuates the light source of the vehicle such that the light source projects the light pattern onto a roadway or onto a roadway boundary barrier which delimits the roadway.

6. The device according to claim 1, wherein said actuation unit actuates the light source of the vehicle such that the light source generates the light pattern as at least one of a multi-colored pattern, a configuration of a plurality of light structures, a brightness pattern or as a pattern which can change over time.

7. The device according to claim 1, wherein the light source is a front headlight or as part of a front headlight of the vehicle.

8. The device according to claim 1, wherein said light source is configured to direct the light pattern onto a portion of the roadway other than a roadway boundary barrier.

9. A vehicle, comprising:

a light source;

a device for assisting a driver in steering the vehicle along a bottleneck, including a roadwork site, said device containing:

a bottleneck detection unit configured to detect bottleneck information for characterizing the bottleneck in which the vehicle is disposed;

a bottleneck information processing unit for processing detected bottleneck information to derive therefrom assistance information for assisting the driver in steering the vehicle along the bottleneck, said bottleneck detection unit connected to said bottleneck information processing unit; and an actuation unit for actuating said light source such that said light source generates a light pattern, which can be seen by the driver, outside the vehicle, the light pattern displaying the assistance information to the driver, said actuation unit connected to said information processing unit;

said actuation unit configured to actuate the light source such that the light source:

generates the light pattern with a visual code which indicates to the driver a current distance of the vehicle from a roadway edge or from a roadway boundary barrier which delimits a roadway, and generates the visual code as a spatially spaced-apart pair of light structures, where a distance between the spatially spaced-apart pair of light structures is proportional to the current distance of the vehicle from the roadway edge or from the roadway boundary barrier which delimits a roadway.

10. The vehicle according to claim 9, wherein said light source is configured to direct the light pattern onto a portion of the roadway other than a roadway boundary barrier.

11. A method for assisting a driver in steering a vehicle along a bottleneck, including a roadwork site, which comprises the steps of:

detecting bottleneck information for characterizing the bottleneck in which the vehicle is disposed;

processing of the bottleneck information detected to derive therefrom assistance information for assisting the driver in steering the vehicle along the bottleneck;

actuating a light source of the vehicle such that the light source generates a light pattern, which can be seen by the driver, outside the vehicle, the light pattern displaying the assistance information to the driver; and performing the step of actuating the light source of the vehicle such that the light source:

generates the light pattern with a visual code which indicates to the driver a current distance of the vehicle from a roadway edge or from a roadway boundary barrier which delimits a roadway, and generates the visual code as a spatially spaced-apart pair of light structures, where a distance between the spatially spaced-apart pair of light structures is proportional to the current distance of the vehicle from the roadway edge or from the roadway boundary barrier which delimits a roadway.

12. The method according to claim 11, wherein the step of actuating the light source is performed such that the light source directs the light pattern onto a portion of the roadway other than a roadway boundary barrier.

13. A non-transitory computer-readable storage medium having computer executable commands stored thereon for performing a method for assisting a driver in steering a vehicle along a bottleneck, including a roadwork site, the method comprises the steps of:

detecting bottleneck information for characterizing the bottleneck in which the vehicle is disposed;

processing of the bottleneck information detected to derive therefrom assistance information for assisting the driver in steering the vehicle along the bottleneck;

actuating a light source of the vehicle such that the light source generates a light pattern, which can be seen by the driver, outside the vehicle, the light pattern displaying the assistance information to the driver; and performing the step of actuating the light source of the vehicle such that the light source:
- generates the light pattern with a visual code which indicates to the driver a current distance of the vehicle from a roadway edge or from a roadway boundary barrier which delimits a roadway, and
- generates the visual code as a spatially spaced-apart pair of light structures, where a distance between the spatially spaced-apart pair of light structures is proportional to the current distance of the vehicle from the roadway edge or from the roadway boundary barrier which delimits a roadway.

14. The non-transitory computer-readable storage medium according to claim 13, wherein the step of actuating the light source is performed such that the light source directs the light pattern onto a portion of the roadway other than a roadway boundary barrier.

15. A combination of a processor and a non-transitory computer-readable storage medium having computer executable commands stored thereon for assisting a driver in steering a vehicle along a bottleneck, including a roadwork site, the processor configured to execute the computer executable commands stored on the computer-readable storage medium to perform the method steps of:
- detecting bottleneck information for characterizing the bottleneck in which the vehicle is disposed;
- processing of the bottleneck information detected to derive therefrom assistance information for assisting the driver in steering the vehicle along the bottleneck;
- actuating a light source of the vehicle such that the light source generates a light pattern, which can be seen by the driver, outside the vehicle, the light pattern displaying the assistance information to the driver; and
- performing the step of actuating the light source of the vehicle such that the light source:
  - generates the light pattern with a visual code which indicates to the driver a current distance of the vehicle from a roadway edge or from a roadway boundary barrier which delimits a roadway, and
  - generates the visual code as a spatially spaced-apart pair of light structures, where a distance between the spatially spaced-apart pair of light structures is proportional to the current distance of the vehicle from the roadway edge or from the roadway boundary barrier which delimits a roadway.

16. The combination according to claim 15, wherein the step of actuating the light source is performed such that the light source directs the light pattern onto a portion of the roadway other than a roadway boundary barrier.

* * * * *